UNITED STATES PATENT OFFICE.

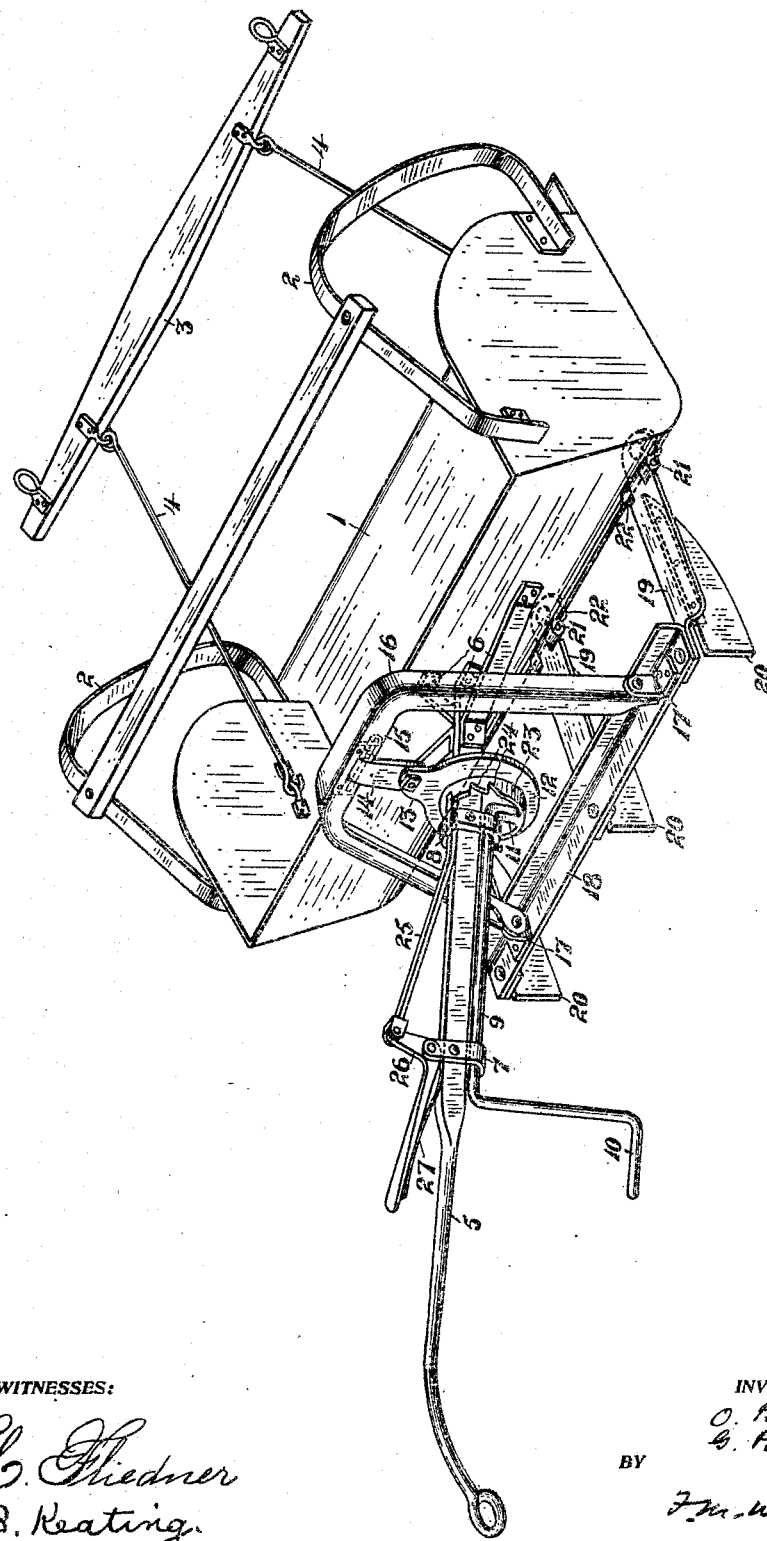

OLOF PETERSON AND GUSTAF PETERSON, OF ALAMEDA, CALIFORNIA.

SCRAPER.

958,889. Specification of Letters Patent. Patented May 24, 1910.

Application filed August 4, 1909. Serial No. 511,179.

*To all whom it may concern:*

Be it known that we, OLOF PETERSON and GUSTAF PETERSON, citizens of the United States, residing at Alameda, in the county of Alameda and State of California, have invented new and useful Improvements in Scrapers, of which the following is a specification.

The present invention relates to an improvement in scrapers of the kind which are dragged over the ground by horses, used principally for the purpose of leveling the ground. When such scrapers, of the kind at present generally in use, are used with a team of horses on ground having an irregular surface, it is not possible to drag the scraper sufficiently close to the side of any ground too steep for the horses to travel over, because of the fact that the scraper must follow the central line of draft between the horses. Also, in dumping, it is not possible, for the same reason, to drag the scraper sufficiently close to the part where it is desired to dump.

The object of the present invention is to provide an improvement in scrapers which will avoid the above objections.

In the accompanying drawing, the figure is a perspective view of a scraper equipped with our improvement.

Referring to the drawing, 1 indicates a scraper bucket of the usual form, having guards 2, a whiffle-tree 3, tug rods 4, and a handle 5, secured to the back of the bucket by braces 6. Secured to said handle and extending beneath the same are yoke-shaped rear bearing 7 and a loop-shaped front bearing 8 for a steering rod 9 having a crank handle 10. The front end of said rod is bent at right angles to form a crank 11, and is attached to, or formed integral with, a steering wheel 12, which is cut out at the center to pass around the handle 5. Said wheel is formed with an upwardly extending lug or projection 13, to which is attached a strap 14 depending from the central part of a pivot pin 15 the ends of which are secured in the upper central part of a yoke 16. The sides of said yoke slope outwardly downward, and attached at their lower ends to brackets 17 on a transverse angle bar 18. Pivotally secured to said angle bar, at the center and ends, are the rear ends of rudder bars 19, to which are secured downwardly extending rudder blades 20. The lower edges of said rudder-blades are curved upwardly at the front ends. The front ends of the rudder bars 19 are attached by horizontal hinge pins 21 to fulcrum plates 22, which are pivoted upon the bottom of the bucket near its rear edge.

The edge of the steering wheel 12 around the central aperture is formed with a crown flange 23, the edge of which is formed with notches 24, in which is adapted to enter the front end of a latching rod 25 which slides over the top of the handle, and within the front bearing 8, the rear of said latching rod being pivotally attached to a bell crank lever 26 pivoted between the upper ends of the yoke-shaped rear bearing 7, the rearwardly extending portion of said bell crank lever being normally raised by a spring 27.

In operation, the driver depresses the rear end of the bell crank lever against the upward pressure of the spring 27, and thereby withdraws the front end of the latching rod 25 from the notch 24 in the crown flange 23 which it is at that time engaging, so that the steering wheel is free to move, and then, by means of the crank handle 10, he turns said steering wheel, the effect of which is to move the upwardly extending lug 13 to the right or left, as may be desired, correspondingly moving the yoke 16 and bar 18 and with them the rudder bars 19 and blades 20 to the right or left, as the case may be. With such lateral movement, there would also be in general a slight vertical movement of the rudder frame, and this is permitted without requiring a corresponding movement of the bucket by reason of the horizontal hinges 21, by which the rudder bars are attached to the bucket. Then supposing, for instance, the rudders have been moved to the right, they will, by their engagement with the slide, cause the bucket to swerve from the direct line of draft, so that it travels at one side or the other, and may thus be brought nearer to the side hill or to the dump. The extent of the lateral movement thus produced will depend upon the length of the tug rods and, in general, on the distance of the bucket from the horses.

We claim:—

1. A scraper comprising a bucket and a plurality of rearwardly extending rudder blades, connections between said blades and buckets permitting said blades to swing laterally, and means for so swinging said blades in unison, substantially as described.

2. A scraper comprising a bucket, a rearwardly extending rudder blade, a connection between said rudder blade and bucket, by which said blade can swing both vertically and horizontally, and means for moving said rudder blade horizontally, substantially as described.

3. A scraper comprising a bucket, a handle extending rearwardly therefrom, a rudder-blade pivotally connected with said bucket, extending rearwardly therefrom, and adapted to turn to either side from its pivot, a shaft rotatably supported upon said handle and having a crank handle, and an operative connection between said shaft and said rudder blade, whereby the latter can be moved laterally, substantially as described.

4. A scraper comprising a bucket, a handle extending rearwardly therefrom, a shaft having bearings mounted on said handle and having a crank handle, a rudder frame, connections between said frame and bucket permitting the frame to move horizontally, and means for supporting said rudder frame on said shaft while permitting it to move with the rocking of said shaft, substantially as described.

5. A scraper comprising a bucket, a handle extending rearwardly therefrom, a shaft having bearings mounted on said handle and having a crank handle, a rudder frame, connections between said frame and bucket permitting the frame to swing horizontally, a steering wheel encircling the handle attached to said frame, said shaft having a crank attached to said steering wheel, substantially as described.

6. A scraper comprising a bucket, a handle extending rearwardly therefrom, a shaft having bearings mounted on said handle and having a crank handle, a rudder frame, connections between said frame and bucket permitting the frame to swing horizontally, and means for retaining said steering wheel in any one of a series of desired positions, substantially as described.

In testimony whereof we have hereunto set our hands in the presence of two subscribing witnesses.

OLOF PETERSON.
GUSTAF PETERSON.

Witnesses:
FRANCIS M. WRIGHT,
D. B. RICHARDS.